United States Patent [19]

DiGianfilippo et al.

[11] Patent Number: 4,568,161

[45] Date of Patent: Feb. 4, 1986

[54] COMPUTER CONTROLLED SLIDE PROJECTOR INTERFACE ARRANGEMENT

[75] Inventors: Dominic J. DiGianfilippo, Prospect Heights; Robert R. Parker, Wheeling, both of Ill.

[73] Assignee: Bell & Howell Company, Skokie, Ill.

[21] Appl. No.: 570,324

[22] Filed: Jan. 13, 1984

[51] Int. Cl.⁴ .............................................. G03B 23/12
[52] U.S. Cl. ......................................... 353/25; 353/94
[58] Field of Search ............................ 353/25, 94, 103

[56] References Cited

U.S. PATENT DOCUMENTS

| | | | |
|---|---|---|---|
| 3,688,262 | 8/1972 | Liquori | 353/103 X |
| 3,907,419 | 9/1975 | Moran | 353/94 |
| 4,076,399 | 2/1978 | Schlei | 353/94 X |
| 4,080,637 | 3/1978 | Chase et al. | 353/86 X |
| 4,086,005 | 4/1978 | Honebrink et al. | 353/94 X |

*Primary Examiner*—Harry N. Haroian
*Attorney, Agent, or Firm*—James V. Lapacek; Joan Pennington; Roger M. Fitz-Gerald

[57] ABSTRACT

An intelligent interface arrangement is provided for controlling and sensing operation of one or more random access slide projectors from a host computer or intelligent terminal. The interface arrangement includes a first microprocessor controlled communication section and a second microprocessor controlled receiver section. One of the receiver sections is provided for each slide projector to be controlled. The communication section bidirectionally communicates with the host over a first communication interface and bidirectionally communicates with the receiver section over a second communication bus structure. The receiver section communicates with the controlled slide projector over a control bus including predetermined signal points in the slide projector and keyboard control lines. The communication protocol of the interface arrangement allows the host to issue commands for one or more of the respective slide projectors, test the status of the slide projectors, receive error messages, and change the communication protocol and data rate. The host via the interface arrangement is capable of controlling the slide projector to project desired slide numbers, to pause, and to perform various other predetermined mode commands to which the microprocessor controlled random access slide projector is programmed to respond via keyboard or program tape inputs.

9 Claims, 9 Drawing Figures

FIG. 4
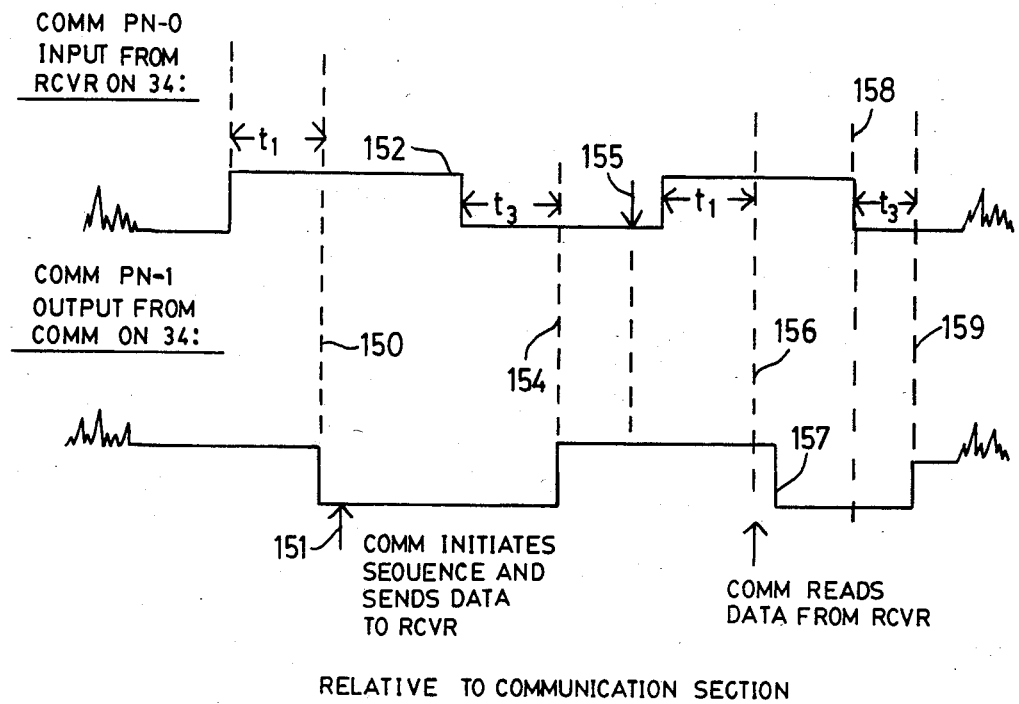
RELATIVE TO COMMUNICATION SECTION
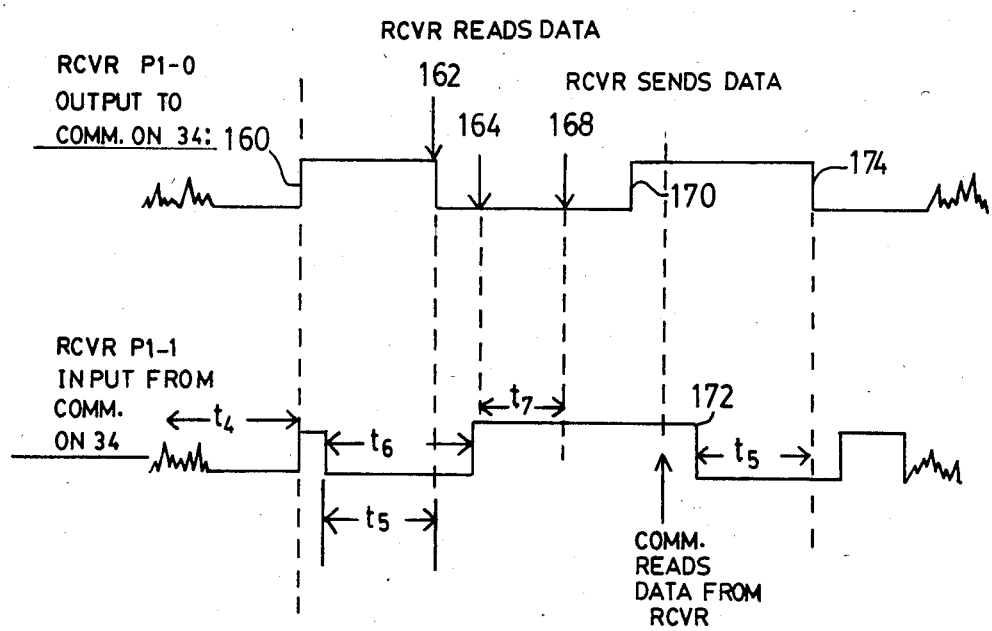
RELATIVE TO RCVR
FIG. 5

COMPUTER CONTROLLED SLIDE PROJECTOR INTERFACE ARRANGEMENT

CROSS REFERENCE TO RELATED APPLICATION

This application is directed to control improvements for random access slide projectors as disclosed in copending Ser. No. 336,522 allowed on Dec. 15, 1983, now U.S. Pat. No. 4,452,518 which is hereby incorporated by reference for all purposes.

FIELD OF THE INVENTION

This invention relates generally to the field of slide projector apparatus and more particularly to an intelligent interface arrangement for controlling a random access slide projector from a host computer or intelligent terminal.

DESCRIPTION OF THE PRIOR ART

A number of control arrangements have been proposed for controlling random access slide projectors. These arrangements include remote keyboard controls having defined function keys and numerical slide number input arrangements, and recorded programs from tape or the like. Arrangements of this type are available as the RINGMASTER ® MODEL 860 series projector from Bell & Howell Company, Chicago, Ill. and disclosed in U.S. Pat. No. 4,452,518.

While these arrangements are generally suitable for their intended use, it would be desirable to provide control of a slide projector from a host computer or intelligent terminal.

SUMMARY OF THE INVENTION

Accordingly, it is a principal object of the present invention to provide an interface arrangement for controlling operation of one or more random access slide projectors from a host computer or intelligent terminal.

It is another object of the present invention to provide an interface arrangement for controlling operation of a plurality of random access slide projectors from any computer or terminal that can communicate over a standardized serial communication interface.

Briefly, these and other objects are achieved by providing an intelligent interface arrangement for controlling and sensing operation of one or more random access slide projectors from a host computer or intelligent terminal. The interface arrangement includes a first microprocessor controlled communication section and a second microprocessor controlled receiver section. One of the receiver sections is provided for each slide projector to be controlled. The communication section bidirectionally communicates with the host over a first communication interface and bidirectionally communicates with the receiver section over a second communication bus structure. The receiver section communicates with the controlled slide projector over a control bus including predetermined signal points in the slide projector and keyboard control lines. The communication protocol of the interface arrangement allows the host to issue commands for one or more of the respective slide projectors, test the status of the slide projectors, receive error messages, and change the communication protocol and data rate. The host via the interface arrangement is capable of controlling the slide projector to project desired slide numbers, to pause, and to perform various other predetermined mode commands to which the microprocessor controlled random access slide projector is programmed to respond via keyboard or program tape inputs.

BRIEF DESCRIPTION OF THE DRAWINGS

The invention both as to its organization and method of operation together with further objects and advantages thereof will best be understood by reference to the following specification taken in conjunction with the accompanying drawing in which:

FIG. 4 is a representation with respect to time of control signals and protocol for the communication and receiver microprocessors of the interface arrangement of FIGS. 1–3 relative to the control timing activities of the communication microprocessor;

FIG. 5 is a representation with respect to time of control signals and protocol for the receiver and communication microprocessors of the interface arrangement of FIG. 1 relative to the control timing activities if the receiver microprocessor;

DESCRIPTION OF THE PREFERRED EMBODIMENT

Figure 1:
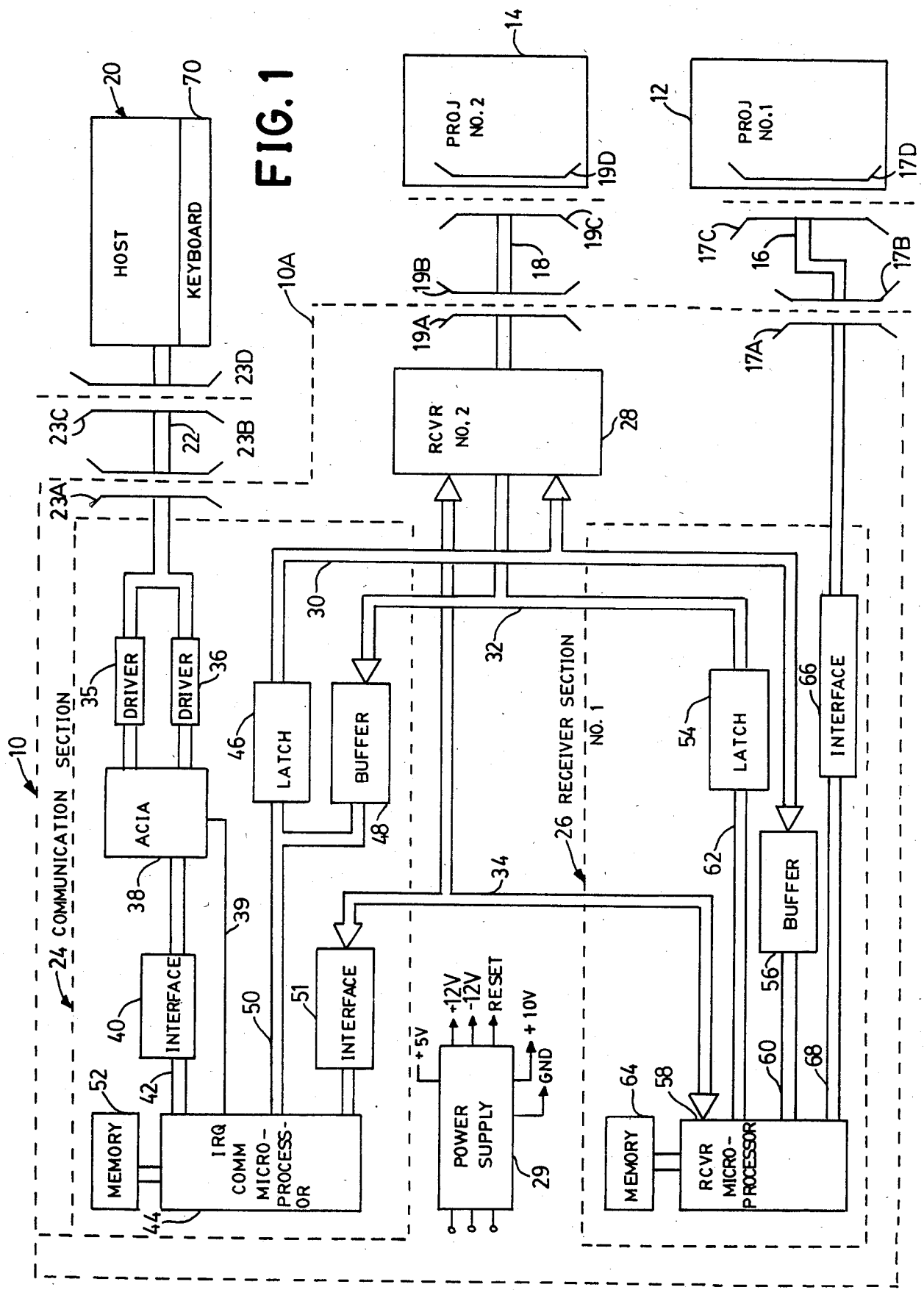
FIG. 1 is a block diagram representation of the interface arrangement of the present invention illustrating the control of a plurality of slide projectors from a host computer or intelligent terminal.

Referring now to FIG. 1, the interface arrangement 10 of the present invention controls and senses operation of one or more random access slide projectors 12, 14 over respective control connections 16, 18 in response to command signals from a host computer or intelligent terminal, hereinafter referred to as host 20. The host 20 communicates with the interface arrangement 10 over a communication interface 22. In a preferred embodiment, the communication interface 22 is an EIA RS-232C asynchronous format data interface. This interface is preferred since most computers and terminals have provisions for an RS-232C interface. Of course, it should be realized that in other embodiments, the invention is implemented using various other interface formats as dictated by either standards or the particular host. Further, it should also be understood that the communication interface 22 in various applications can be provided as either direct connection or by remote connection over telephone lines and the like.

The interface arrangement 10 includes a communication section 24 and a receiver #1 section 26. The interface arrangement 10 includes a receiver section for each slide projector to be controlled; e.g. RECEIVER #1 for PROJECTOR #1 and RECEIVER #2 referred to at 28 for PROJECTOR #2. The communication section 24 in various specific embodiments is implemented to drive and control N slide projectors via an equal number N of respective receiver sections identical to receiver section 26. In specific embodiments, the number N is normally in the range of 1 to 7 as dictated by application requirements and control efficiency.

In the preferred embodiment, the interface arrangement 10 includes a housing 10A for mounting and enclosing the communication section 24, the various receiver sections 26, 28 for example and a power supply 29. In a specific embodiment each of the sections 24, 26 and 28 is provided on a separate printed circuit board. The communications interface 22, and the control connection 16, 18 for example are provided as multi-conductor interconnection cables along with suitable connectors. For example, the control connection 16 of the receiver section 26 includes a connector 17C for interfitting with a connector 17D of the projector 12, and a connector 17B for interfitting with a connector 17A mounted on either the housing 10A or the receiver board 26. Similarly, the interface 22 includes connectors 23A, B, C and D and the control connection 18 includes connectors 19A, B, C and D.

The communication section 24 communicates with the host 20 over the interface 22. The communication section 24 communicates with the receiver sections 26 and 28 for example, over two data buses 30 and 32. One data bus 30 is used for sending data to each of the receiver sections 26, 28 and the second data bus 32 is used for receiving data from the receiver sections 26, 28. The communication section 24 and the receiver sections 26, 28 are also interconnected via a control connection bus 34.

The control connection 16 includes bidirectional control for the inputting of slide numbers and mode commands to the slide projector 12 and for the outputting of information to the receiver section 26 representing various status conditions of the slide projector 12. The status conditions include representations of signals in the slide projector such as pause, reverse, forward, home position, incremental slide count, tray traveling, 80 or 140 slide tray, and motor sense. These signals, as will be explained in more detail hereinafter, are derived from signals at predetermined points of the control apparatus of the microprocessor controlled slide projector 12. The status condition of the projector 12 sensed by the receiver section 26 enables the projector 12 to be used as a terminal connection device. For example, selections entered on the keyboard of the projector 12 in response to items on a menu on a slide or the like can be monitored by the host 20. Accordingly, a bidirectional communication system is provided. The slide projectors 12, 14 in the preferred embodiment are of the type commercially available as RINGMASTER® MODEL 860A from Bell & Howell Company, Chicago, Ill. and as disclosed in U.S. Pat. No. 4,452,518 which is hereby incorporated by reference for all purposes.

The control connection bus 34 includes two handshake control lines between the communication section 24 and each microprocessor of each receiver section e.g. 26, 28. The handshake control lines of the control connection bus 34 are utilized by the communication section 24 to identify the particular desired receiver section for which a message or communication is intended and for the identified receiver section to respond. The data on the communication output bus 30 carries slide number command, mode control and status request message data. The data on the communication input bus 32 carries acknowledgment messages and slide projection status information derived by each receiver section. In addition to slide number and mode commands for identified projectors, the communication interface 22 carries: requests by the host 20 for status of each of the slide projectors, requests by the host 20 as to communication format change information; and status and error messages as to the condition of the various slide projectors and the interface arrangement 10.

The RS-232C serial communication lines of communications interface 22 are connected to two driver stages 35, 36 of the communication section 24. The outputs of the driver stages 35, 36 are connected to an asynchronous communication interface adapter (ACIA) stage 38. The serial data on the interface 22 is organized into parallel form by the ACIA stage 38. The ACIA stage 38 is connected via an interface stage 40 and the data bus and control lines referred to collectively at 42 to the communication section microprocessor 44. An IRQ (interrupt request) line 39 of the ACIA stage is connected to a control line of the microprocessor 44. Accordingly, the ACIA stage 38 under control of the communication section microprocessor 44 and along with the host 20 control the bidirectional serial signal path and appropriate interface control signals of the interface 22 to communicate data messages between the host 20 and the communication section microprocessor 44. The interface stage 40 includes a data buffer and a data latch for incoming and outgoing data respectively from the communication section 24. The interface stage 40 also includes a data latch for the input of control information to the ACIA stage 38 from the data and control bus 42 of the communication section microprocessor 44 hereinafter, referred to as the communication microprocessor 44.

The communication microprocessor 44 controls an outgoing data latch 46 and an incoming data buffer 48 over appropriate read/write enable lines of the control lines section of a control lines and data bus referred to collectively at 50. The outgoing data latch 46 provides the communication output bus 30 to the receiver sections and the buffer stage 48 receives the communication input bus 32 from the receiver sections.

The communication section 24 also includes a nonvolatile memory stage 52 for program storage. An interface stage 51 is connected to the control bus 34 to provide appropriate control signals for the receiver microprocessor handshake lines from the communication microprocessor 44.

The receiver section 26 includes a data latch 54 connected to the communication incoming data bus 32 to transmit data to the communication section 24. The receiver section also includes a data buffer 56 connected to the communication outgoing data bus 30 to receive data from the communication section 24. The data buffer 56 is connected to a receiver section microprocessor 58 over data bus and control signal lines referred to collectively at 60. The data latch 54 is connected to the receiver section microprocessor 58 over data bus and control signal lines referred to collectively at 62. The receiver section 26 includes a non-volatile memory stage 64 for program storage. The receiver section 26 also includes an interface stage 66 connected to the control signal lines 16 to PROJECTOR #1 referred to at 12. The interface stage 66 is connected to the receiver section microprocessor 58 (hereinafter receiver microprocessor 58) over data bus and control lines referred to collectively at 68.

As will be explained in more detail hereinafter, the receiver section e.g. 26 constantly monitors the various status conditions of the respective controlled projector and reports to the communication section 24 on status. If an error condition is detected by the communication section 24, the error message is sent to the host 20 when the receiver is polled by the communication section 24.

Considering now the various commands, status information and status requests, communication format signals, and error messages passed between the host 20 and the communication section microprocessor 44 over the data interface 22, the following TABLE I summarizes the various data (where the "N" communication section or projector selected column refers to the identified number 1, 2, 3, etc. of the selected projector and "∅" refers to the communication section):

standard control character (control B) to indicate that data is to be transmitted and the "ETX" represents an end of transmission signal (control C).

The following are examples of various status requests issued by the host 20:

To ask for Communications Section status, i.e., current baud rate, parity, and number of stop bits:
  STX ∅ T ETX
To ask for current status of any projector:
  STX N T A ETX
To ask for current location of any projector:
  STX N T L ETX
To ask if projector has 140 slide tray:
  STX N T F ETX
To ask if program tape motor is stopped by hardware:
  STX N T S ETX
To ask if program tape motor is paused by software:
  STX N T P ETX
Note: N in all above is a number from 1 to 7 and refers to the number of the projector being addressed.

TABLE I
DATA TRANSMISSION HOST TO INTERFACE BOX

| Function | Start Transmission | "N" Comm Sec. or Projector Selected | Command | Slide # or Command # Other Infor. | End of Transmission |
|---|---|---|---|---|---|
| GO TO HOME | STX | 3 | G | ∅ | ETX |
| GO TO 5 | STX | 2 | G | 5 | ETX |
| GO TO 27 | STX | 1 | G | 2 7 | ETX |
| GO TO 121 | STX | 2 | G | 1 2 1 | ETX |
| *EXECUTE 2∅1 | STX | 1 | X | 2∅1 | ETX |
| PAUSE | STX | 3 | P | | ETX |
| RESTART | STX | 2 | R | | ETX |
| HARDWARE PAUSE | STX | 1 | H | | ETX |
| RESTART HARD. PAUSE | STX | 2 | A | | ETX |

| Function | Start Transmission | "N" Comm Sec. or Projector Selected | Slide # # Other Command | or Command Trans- Infor. | |
|---|---|---|---|---|---|
| **STATUS | STX | 1 | T | A | ETX |
| CHANGE BAUD RATE TO 9600 | STX | ∅ | B | 9 | ETX |
| CHANGE BAUD RATE TO 1200 | STX | ∅ | B | 1 | ETX |
| CHANGE BAUD RATE TO 2400 | STX | ∅ | B | 2 | ETX |
| CHANGE BAUD RATE TO 300 | STX | ∅ | B | 3 | ETX |
| CHANGE BAUD RATE TO 4800 | STX | ∅ | B | 4 | ETX |
| CHANGE BAUD RATE TO 600 | STX | ∅ | B | 6 | ETX |
| CHANGE PARITY TO: | | | | | |
| NO PARITY | STX | ∅ | I | ∅ | ETX |
| ODD PARITY | STX | ∅ | I | 1 | ETX |
| EVEN PARITY | STX | ∅ | I | 2 | ETX |
| CHANGE # OF STOP BITS TO: | | | | | |
| 1 STOP BIT | STX | ∅ | 0 | 1 | ETX |
| 2 STOP BITS | STX | ∅ | 0 | 2 | ETX |
| PERFORM CHNGE OF BAUD RATE, PARITY, STOP BITS | STX | ∅ | C | | ETX |

*only 200, 201, 202, 209, 210, 211, 212 are valid
Additional status requests are listed hereinafter For example, the command STX N G53 ETX represents the command from the host 20 to the communication section microprocessor 44** for the slide projector "N" to "GO TO" slide "53". The "STX" represents a Spaces between characters above are shown for clarity. There are no spaces in actual use.

The following Table II illustrates various error, status and miscellaneous codes:

TABLE II

(ERROR, STATUS, AND OTHER CODES)

| CODE | CAUSE |
|---|---|
| E0A | Framing, Parity, Overrun Error Code |
| E0B | Transmit start error code |
| E0C | End of Transmit error code |
| E0D | End of Transmit should have occurred error code |
| E0E | Invalid RM number |
| ENF | An invalid command was requested; only G, X, P, R, H, T, B, I, O, A are valid |
| ENG | Invalid slide # requested |
| ENH | 80 slide tray is present, but slide # between 80 and 141 was asked for |
| ENI | Invalid 200 command requested |
| E0J | Invalid Baud Rate setting |
| E0K | Invalid Parity setting |
| E0L | Invalid Stop Bit setting |
| ENM | Error in communications between Communications and slave Microprocessor |
| ENX | Status request error |
| E0* | Reversion error (previous baud rate, parity, and stop bits are re-instated) |
| SNA | Tape motor is stopped by hardware |
| SNB | Tape motor is not stopped by hardware |
| SNC | Tape motor is paused by software |
| SND | Tape Motor is not paused by software |
| SNE | 80 slide or no slide tray is installed |
| SNF | 140 slide tray is installed |
| SNN | Proj. is off |
| SNO | Did not reach destination |
| SNP | Did not Pause |
| SNQ | User manually causing slide tray to rotate |
| SNR | Interface micro busy |
| SNS | Did not reach home |
| SNT | Proj. received data |
| SNU | Proj. not connected |
| SNV | Proj. is busy doing last command |
| SNW | Proj. is OK |
| SNZ | No change in status |
| LNABC | Location of projector slide tray. "A" is hundreds digit, "B" is tens digit, "C" is units digit. |
| C## | Baud rate, parity, number of stop bits received by communications microprocessor |

The number "0" in the second character of code in each of the commands or messages refers to the communication section 24 since these codes are only for the communication section.

Considering error codes, the error code "ENH" represents an error "E" from projector "N" for which the error code "H" has occurred indicating that a slide number in the previous command was out of range (i.e. between 80 and 141) when an 80 slide tray was in position.

When the host 20 requests the status of the communication section 24 by sending STX 0T ETX, the letter "C" followed by two digits is returned by the communication section 24. The left and right digits represent the data shown in TABLE III as follows:

| Left Digit | Parity | Number of Stop Bits |
|---|---|---|
| 0 | None | 2 |
| 1 | Odd | 2 |
| 2 | Even | 2 |
| 4 | None | 1 |
| 5 | Odd | 1 |
| 6 | Even | 1 |

The right digit reports the following data:

| Right Digit | Baud Rate |
|---|---|
| 1 | 1200 |
| 2 | 2400 |
| 3 | 300 |
| 4 | 4800 |
| 6 | 600 |
| 9 | 9600 |

The various commands and messages from the host 20 are, for example, sent directly from a stored program of the host 20 or alternatively can be directly entered from a keyboard 70. The keyboard entries are either as shown in Table I or another format with translation of the host 20 to the format of Table I.

Considering the various codes in the Tables I, II and III, while the codes refer to characters and numerals, it should be understood that the actual codes are sent over the interface 22 in standard ASCII format in the preferred embodiment for RS-232C usage.

Concerning other areas of communication format protocol which the host 20 communicates over interface 22 to the communications section 24, the host 20 determines if communication has been established by asking for a status of the communications section 24 with the message STX 0T ETX. If valid status information is returned by the communication processor 44 over interface 22, the host 20 determines that communication has been established. The communication processor 44 returns valid status information as the message C## conveying parity, number of stop bits and baud rate information of the current requested format as shown in Table III.

In order to change baud rate, parity and number of stop bits, the appropriate commands as shown in Table I are sent by the host 20 to the communication section 24 over the communications interface 22. Then a perform change command of baud rate, parity or stop bits is given. Further, within a specified predetermined period of time of the sending of the perform change command, a host status command must be sent in the new format such as STX 0T ETX. If such a command is not sent within the specified period of time, the communications microprocessor 44 will revert to the previous baud rate, parity, and number of stop bits and will issue an E0* error code to signify that a reversion error has occurred.

Thus, for example, to change from the standard initialized established rate of 300 baud, even parity, one stop bit, 7 bit word length, to a 1200 baud rate, the sequence of communications is as follows:

STX 0B 1 ETX (sent by host)
STX 0C ETX (sent by host)
STX 0T ETX (sent by host with predetermined time of perform change command, the previous step)
C61 (sent by communications section 24)

The receiver sections, for example, 26 and 28, as discussed previously only communicate status when they are polled by status data signals being sent over bus 30 from the communications section 24. When the receiver sections do respond to a particular status request, in the preferred embodiment the response on bus 32 is encoded in ASCII code to represent the last character of each status code in table II when the appropriate status is requested. Of course, in other embodiments it should be realized that any appropriate data code on data bus 32 could be returned to the communications interface as long as the proper look up table or decoding information is provided to the communications microprocessor 44 to recognize the predetermined communications format from the receiver microprocessors such as 58. Thus, numerical codes could also be utilized.

Considering the various codes and requests for status commands by the communications section 24 over bus 30 to the various receiver sections such as 26, and referring to the command code tables of a particular embodiment in U.S. Pat. No. 4,452,518, the communications microprocessor 44 at bus 30 outputs command messages in binary format such that the numbers 0-140 are reserved for slide numbers and interpreted by the receiver microprocessor as a go to slide number command, the number zero designating home. The numbers 200, 201, 202, 209, 210, 211 and 212 in binary code on bus 30 represent the various commands as shown in the aforementioned application and as briefly categorized below:

| Code | Function |
| --- | --- |
| 200 | Auto advance-5 seconds |
| 201 | Auto advance-10 seconds |
| 202 | Auto advance-15 seconds |
| 209 | Remote control enable |
| 210 | Remote control disable |
| 211 | Display Blank |
| 212 | Display unblank |

Various other control codes are used for command and status information in the numbered series, for example, from 150 to 180 which are above any valid go to slide number command status and below the other listed mode commands of the range 200+. For example, the binary equivalents of the following code numbers define the respective commanded functions and requested status:

| | |
| --- | --- |
| 150 | Pause |
| 155 | Remove Pause |
| 160 | Hardware Pause |
| 165 | Remove hardware pause |
| 170 | Location Status |
| 171 | 80/140 status |
| 172 | Tape Motor Hardware Status |
| 173 | Tape Motor Pause by Software Status |
| 174 | General Status (as being on/off) |
| 175 | General status and also whether 80 or 140 slide tray status |

Of course, it should be understood that in various embodiments other numerical or alpha numerical codes for commands and status could be sent by the communications section 24 and recognized by the various receiver sections such as 26, 28 and the codes listed hereinbefore are intended for illustrative purposes only and for reference to the aforementioned application for completeness:

Concerning other general operating parameters of the preferred embodiment, during the command sequence process if an error code results the command must be resent. If a host generated command is sent to a receiver, the receiver generates a "T" character signifying "data received" to the communications section 24 and correspondingly the communication section sends a status code SNT to the host 20. If either of the "T" or "SNT" messages are not sent, the command must be resent. Further, if a 200, 201 or 202 was sent as above, tray movement must be deenergized by the host 20. Further, if any of the following errors occur the host 20 will be informed at the earliest opportunity: slide tray did not reach destination; recorder did not pause; user has manually sent slide tray to another destination; interface microprocessor busy; and slide tray did not reach home.

Figure 2:
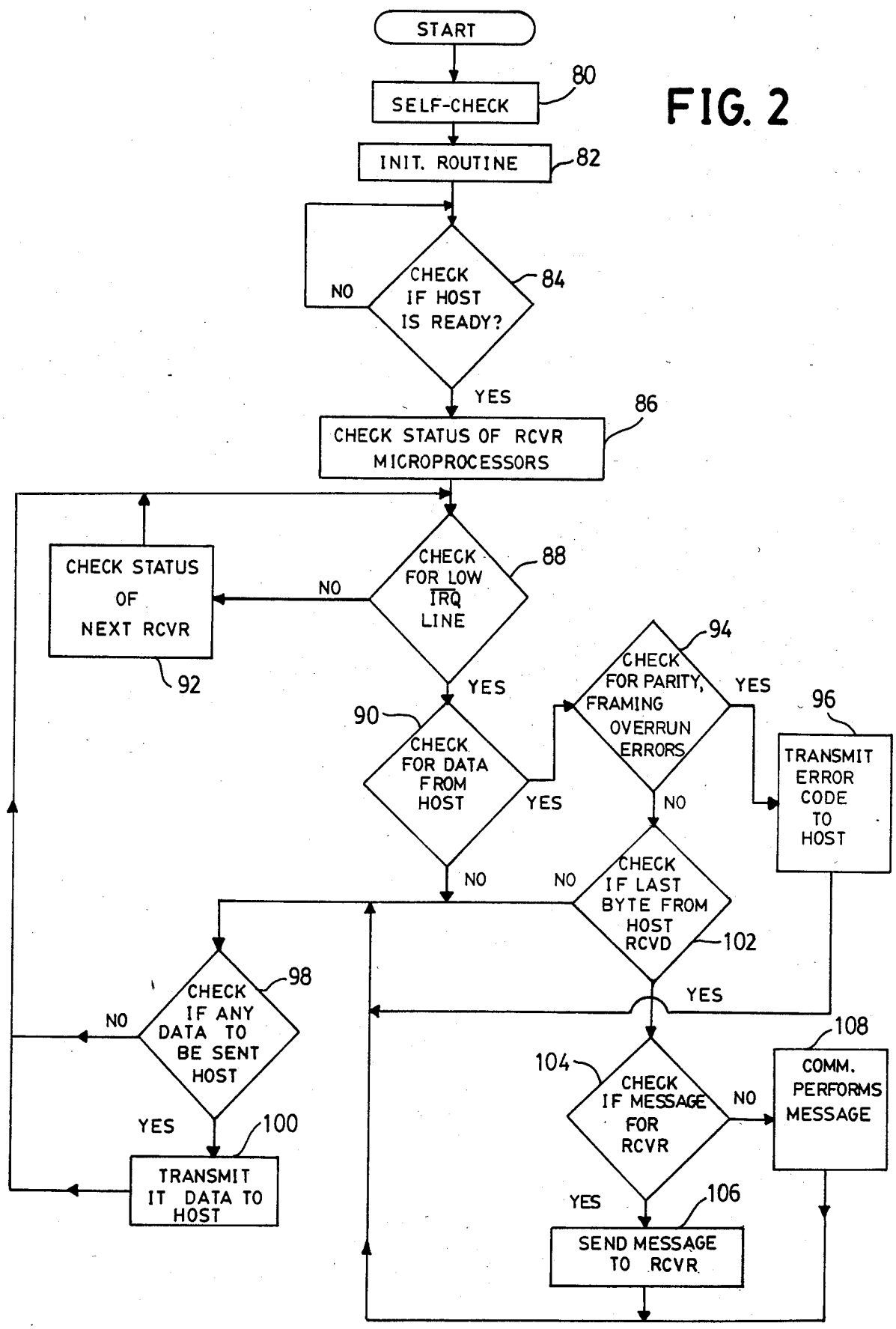
FIG. 2 is a flow diagram representation illustrating the program flow of operation of the communication section of the interface arrangement of FIG. 1.

Considering now the program operation of the communication section microprocessor 44 and referring to the flow diagram of FIG. 2, upon power-up of the interface arrangement 10, the program flow initializes with a self-checking function 80 wherein the microprocessor 44 performs a test of memory operation. The program flow then proceeds to a function block 82 to perform an initializing routine wherein the random access memory is initialized or set to zero and various output ports of the microprocessor 44 and communication section 24 are appropriately initialized.

The program flow then proceeds to a decision block 84 where a check is made to see if the host 20 is ready for communications. If the self check routine 80 is not successful, the program flow would not proceed to the decision block 84.

In decision block 84 the communications microprocessor 44 begins a communications check with the host 20 via the communication interface 22. In a preferred embodiment wherein the communication interface 22 is an RS-232C communications interface, the communication microprocessor 44 sets a DTR or data terminal ready signal to +12 volts and shuts off the RTS transmitter control line to a −12 volt level. Decision block 84 determines whether the host 20 has responded by checking if the DTR line of the interface 22 has been set by the host to +12 volts and the transmitter control RTS has been set to −12" volts. The microprocessor 44 over the interface 22 monitors the DTR line of the host 20 over the DSR data set ready line. Further the communication microprocessor 44 over interface 22 monitors the RTS line of the host 20 over the clear-to-send or CTS line. If this communication protocol is established the determination in block 84 is yes and program flow proceeds to function block 86. If the protocol is not established with the host 20 in decision block 84, the determination in 84 is no and the program flow proceeds along the no signal path to continue checking operation in decision block 84.

In function block 86, the status of the various receiver microprocessors, for example, 58, are checked or polled. This is accomplished by sending appropriate data messages from the microprocessor 44 over bus 30 to the receiver microprocessor 58 of receiver #1, for example. In response, the receiver microprocessor 58 over bus 32 responds to the communications microprocessor 44 to indicate both general status as to being on or off and also as to the type of tray being carried by the projector associated with the particular receiver section. Of course, as discussed previously, the initial communication with the receiver is accomplished over the handshake control signal lines in the control lines of bus 34.

After function block 86, the program flow then proceeds to a decision block 88 where the communications microprocessor 44 checks the interrupt request line IRQ at 39 of the ACIA stage 38. If an interrupt request has been received from the ACIA stage 38, the determination in decision block 88 is yes and the program flow proceeds to a decision block 90 to check if data has been received from the host 20. If the determination in the decision block 88 is no, the program flow proceeds through a function block 92 to check the status of the next receiver and then to proceed back to the beginning of decision block 88 to again check for interrupt request. Accordingly, if no interrupt request is determined in block 88, the program flow proceeds to successively check or poll the check status of the receiver microprocessors and loop through a check for interrupt request.

Considering the situation where an interrupt request is found in the decision block 88 and data has been received from the host, the program flow proceeds from the "yes" path of decision block 90 to a decision block 94 to check for parity, framing, and overrun errors as to the communication formatting. If any errors are detected in decision block 94, the program flow proceeds to a function block 96 to transmit the error code to the host 20. After the error code has been transmitted to the host 20, the program flow proceeds out of function block 96 to a decision block 98 to check if any data should be sent to the host 20.

In decision block 90 if no data is received from the host then the determination is no and the program flow would proceed directly to the decision block 98 to check for data to be sent to the host. The determination in the decision block 98 involves whether or not status or error indications have been received from any of the various receiver microprocessors which would indicate that status should be forwarded to the host regarding the various error and status codes as shown with the various associated causes in Table II. If the determination in decision block 98 is yes that data should be sent to the host, the program flow proceeds to a function block 100 to actually transmit the data to the host 20. The function block 100 represents the various response information to be sent to the host as indicated for the various purposes in Table II. After transmission of the appropriate data to the host 20, the program flow proceeds out of the function block 100 back to the decision block 88 to again check for interrupt requests.

In decision block 94, if no errors in parity, framing, or overrun are detected, the determination is no and the program flow proceeds to a decision block 102 wherein the determination is made to check if the last byte of message from the host has been received corresponding to the predetermined communication format including the ETX end of signal byte. If the determination is no, the program flow proceeds from the decision block 102 into the decision block 98 as previously discussed to check if any data should be sent to the host.

If the determination in the decision block 102 is yes, the program flow proceeds to a decision block 104 to check if the received message was meant for a receiver microprocessor. If the determination is yes, the program flow proceeds to a function block 106 to send a message to the identified receiver microprocessor in appropriate data format. For example, if a message received from the host 20 is decoded as projector #1 go to slide position 43 the data number 43 on the databus 30 will be sent to receiver #1 after establishing communication with receiver #1 microprocessor 58.

If the determination in the decision block 104 is no, corresponding to the message not being meant for a receiver microprocessor, then the program flow proceeds to a function block 108 where the communication microprocessor 44 performs the message since the message must be of the category for either status or communications format for the communication microprocessor. After the function block 108 is performed, the program flow proceeds back to the decision block 98 to check if any data should be sent to the host.

Figure 3:
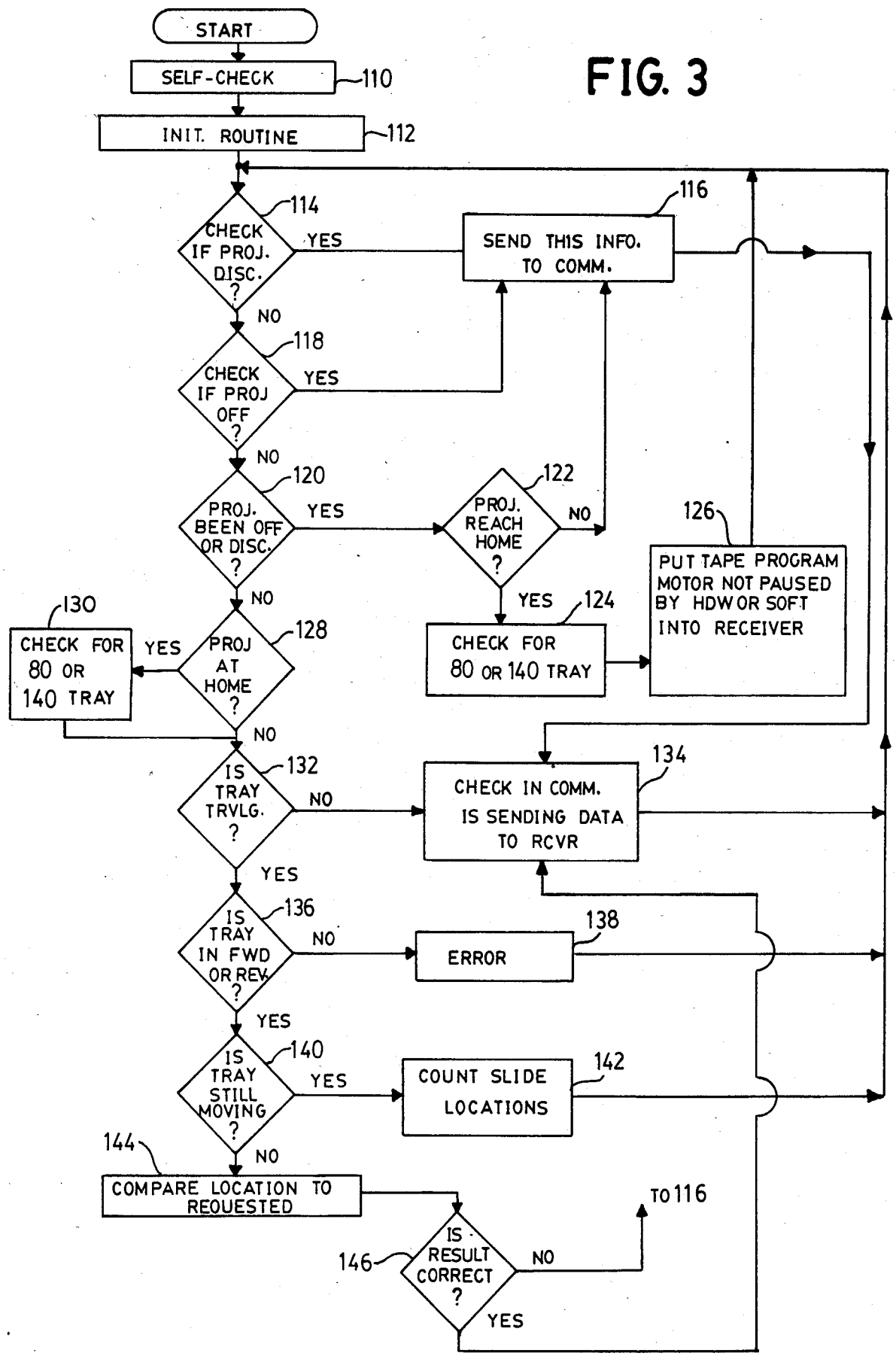
FIG. 3 is a flow diagram representation illustrating the program flow of operation of the receiver section of the interface arrangement of FIG. 1.

Considering now the program operation of the receiver section microprocessor 58 (which is identical for each of the receiver microprocessors) and referring to the flow diagram of FIG. 3, the program flow of the receiver microprocessor begins with a self check function 110 which checks memory functions and proceeds to an initializing routine function block 112 to initialize the memory. The program flow then proceeds from the function block 112 to a decision block 114. In decision block 114, a check is made to determine if the projector being controlled and monitored is disconnected. If the determination is yes, the program flow proceeds to a function block 116 which represents the function of sending various information to the communications microprocessor 44. For example, the functions in 116 include the projector being disconnected or off or if the projector had not reached home position. The function block 116 actually represents the storing and sending of data when requested by the communication microprocessor 44.

With a no determination in decision block 114, the program flow proceeds to a decision block 118 to determine if the projector is off. If the projector is off, the determination is yes and the program flow proceeds to the function block 116 to send out the appropriate information. If the determination in block 118 is no, the program flow proceeds to a decision block 120 to check if the projector had been off or previously disconnected. If the determination in decision block 120 is yes, the program flow proceeds to a decision block 122 where a determination is made to check if the projector reached home. If the determination is no in the decision block 122, the program flow proceeds to the function block 116 to send out appropriate information. If the determination in the decision block 122 is yes, the program flow proceeds to a function block 124 to check for either a 80 or 140 slide tray being present on a projector. The program flow then proceeds to a function block 126 to store into an appropriate register of the receiver microprocessor the message that the program tape drive motor was not paused by hardware or software. The program flow after the function block 126 then proceeds back to the decision block 114 to again check if the projector is disconnected.

Continuing with the program flow from the decision block 120, if the determination is no, the program flow proceeds to a decision block 128 to check if the projector is at home position. If the determination is yes, the program flow proceeds to a function block 130 to check for 80 or 140 slide tray operation being present. After the function block 130, the program flow continues to a decision block 132 to check if the slide tray is currently traveling or moving. If the determination in decision block 128 is no, the projector is not at home position and the program flow proceeds to the decision block 132. If the determination in decision block 132 is no, the slide tray is not in motion, the program flow proceeds to a function block 134 to check if the communications microprocessor 44 is sending data to the receiver microprocessor. If the communication microprocessor is sending data to the receiver microprocessor and the data is successfully received, the receiver microprocessor will send a data received message, character T, and the receiver microprocessor will perform the appropriate data request. After this has been accomplished in the function block 134, the program flow proceeds back to the decision block 114 to again perform the various checks and functions.

If the determination in the decision block 132 is yes that the slide tray is in motion, the program flow proceeds to a decision block 136 where the determination is made to check if the tray is in forward or reverse motion. If forward or reverse motion is not detected then the determination is no in decision block 136 and the program flow proceeds to a function block 138 to store that an error has been detected. After error function block 138, the program flow proceeds back to the decision block 114.

If the determination in decision block 136 is yes, the slide tray is moving in forward or reverse, the program flow proceeds to a decision block 140 to check if the tray is still moving. If the determination in the decision block 140 is yes and the slide tray is still moving, the program flow proceeds to a function block 142 to count the slide locations on a count line from the control connection 16. After the function block 142, the program flow proceeds to the decision block 114.

If the determination in the decision block 140 is no, the tray is not moving, the program flow proceeds to a function block 144 to compare the new location of the slide tray to the requested position defined by the received data from the communications microprocessor 44. From the function block 144, the program flow proceeds to a decision block 146 to check if the result of the comparison of actual and requested locations is correct. If the result is correct, the determination in block 146 is yes and the program flow proceeds to the function block 134 to check if the communications microprocessor is sending data to the receiver microprocessor 44.

Referring now to FIG. 4 and considering the protocol for the handshake signalling and control lines on the control bus 34 between the communication section 24 and each of the receiver sections (e.g. 26, 28, etc.) the PN-0 waveform versus time represents the signal on one line, for example, P1-0 of the bus 34 that is an output control line of the microprocessor 58 of receiver section #1. The P1-0 signal is connected as an input sense signal to the communication microprocessor 44. The PN-1 waveform represents the signal on one line for example P1-1 of the bus 34 that is an output control line of the communication microprocessor 44 and connected as an input sense line to the receiver #1 microprocessor 58. The bus 34 includes a signal pair PN-0 and PN-1 for each controlled projector N and respective receiver #N. The operation and control via each of the signal pairs is similar and will be illustrated by the P1-0 and P1-1 lines for receiver and projector #1. The timing representation of FIG. 4 is relative to the communication microprocessor 44.

The communication microprocessor 44 polls one receiver microprocessor at a time for status and requests communication with each receiver microprocessor as necessary to execute host commands.

Whenever data is to be sent to a receiver or data is to be read from a receiver, the communication microprocessor 44 checks for a predetermined time duration $t_1$ of high level signal on the P1-0 line to determine that the receiver microprocessor 58 is not in a busy state. The predetermined time duration $t_1$ in one specific embodiment is 50 microseconds. As shown at 150, if the high level signal for time $t_1$ is detected, the communication microprocessor 44 switches the P1-1 output control line to a low level to indicate to the receiver microprocessor that communication is to be established. If a predetermined time duration $t_2$ (not shown) of low level signal on P1-0 is detected by the communication microprocessor 44, the receiver microprocessor 58 is determined to be in a busy state. The predetermined time duration $t_2$ is 100 microseconds in a specific embodiment.

We will first consider a case where a command or status request is to be sent to the receiver. After the communication microprocessor 44 determines that the receiver is not busy and switches the P1-1 line to a low level at 150, the communication microprocessor 44 sends out the desired command or status request on the data bus 30 at time 151. After receiving the data, the receiver microprocessor 58 switches the P1-0 line to a low level at 152 to acknowledge to the communication microprocessor 44 that the data was received. After detecting that the P1-0 line is low for a time period $t_3$ (also 50 microseconds in a preferred embodiment), the communication microprocessor 44 switches the P1-1 line high at 154. At this point 154, the communication microprocessor 44 has been made aware that the receiver has received the command or status request message.

Subsequently, the receiver in response to a command stores the command data for action after the data interchange and sends the data acknowledgment code for "data received" to the communication microprocessor on the data bus 32 at time 155. If a status request is sent to the receiver, the receiver responds at 155 by sending out the status. After sending out the status or acknowledgment, the receiver switches the P1-0 line to a high level. The communication microprocessor 44 detects the high level P1-0 line for the time period $t_1$ and at 156 reads the data from the receiver. After reading the data, the communication microprocessor 44 switches the P1-1 line to a low level at 157 to advise the receiver microprocessor that the data has been received. In response to the low P1-1 line at 157, the receiver microprocessor 58 at time 158 switches the P1-0 line to a low level to advise the communication microprocessor 44 that the acknowledgment has been received. In response to detecting the low P1-0 line for time period $t_3$, the communication microprocessor 44 switches the P1-1 line high at 159.

Considering now the timing and control of the lines P1-0 and P1-1 relative to the receiver microprocessor 58 and referring now to FIG. 5, the receiver microprocessor monitors the P1-1 line for a high signal for a time interval $t_4$. If a high signal is detected, the P1-0 line is switched to a high level as shown at 160. The time duration $t_4$ in a specific embodiment is 10 milliseconds. Next, the receiver microprocessor 58 monitors the P1-1 line for a low level for a $t_5$ continuous duration over an interval $t_6$. If the $t_5$ duration low level is detected on P1-1, the P1-0 line is switched low at 162. The interval $t_5$ is 50 microseconds and $t_6$ is 10 milliseconds in a specific embodiment. If the continuous low level for the $t_5$ interval is not detected, the communication microprocessor 44 is not requesting data interchange with the receiver microprocessor 58. If the continuous low level is detected, the receiver microprocessor 58 reads the data at 162.

After the receiver reads the data at 162 and detects the low level P1-1 for the $t_5$ time period, the P1-0 line is switched low to indicate that the receiver is ready. The receiver microprocessor monitors the bus 30 for status request data or for received command codes at 164. If a status request is received, the status data is sent out on bus 32 as shown at the time 168. Before the data is sent out on bus 32 at time 168 by the receiver microprocessor, the receiver first detects the high level P1-1 signal for the time period t₇ from the time 164 at which the P1-1 line went high. If the data received at 162 is a command, the data code is stored for execution after the data interchange is over. At time 168, a received data acknowledgement SNT is sent out on the bus 32 in response to a command. Data is sent out at 168, and then the P1-0 line is switched high at 170.

At 172, the P1-1 line is switched low after the communication microprocessor 44 reads the data from the receiver. In response to the P1-1 being switched low, the receiver switches the P1-0 line to a low level at 174 after detection by the receiver microprocessor 58 of the low level on P1-1 for the time duration $t_5$.

For each of the time durations $t_1$, $t_3$, and $t_7$, the detection criterion in a specific embodiment is 50 microseconds of a respective high or low signal within a 1 millisecond time interval or window.

Figure 6:
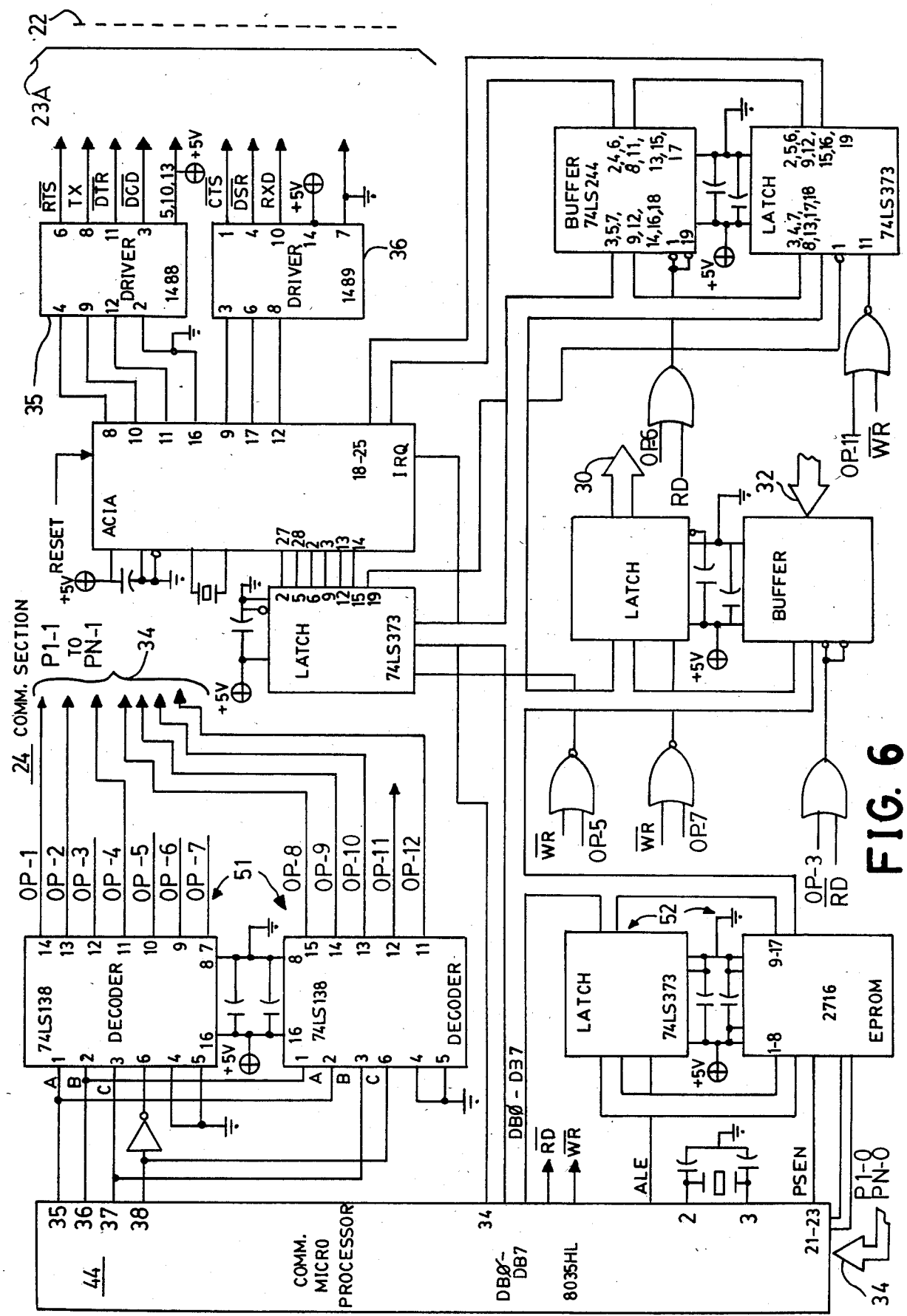
FIG. 6 is a detailed logic and block schematic diagram of a preferred embodiment of the communication section of the interface arrangement of FIG. 1.
Figure 7:
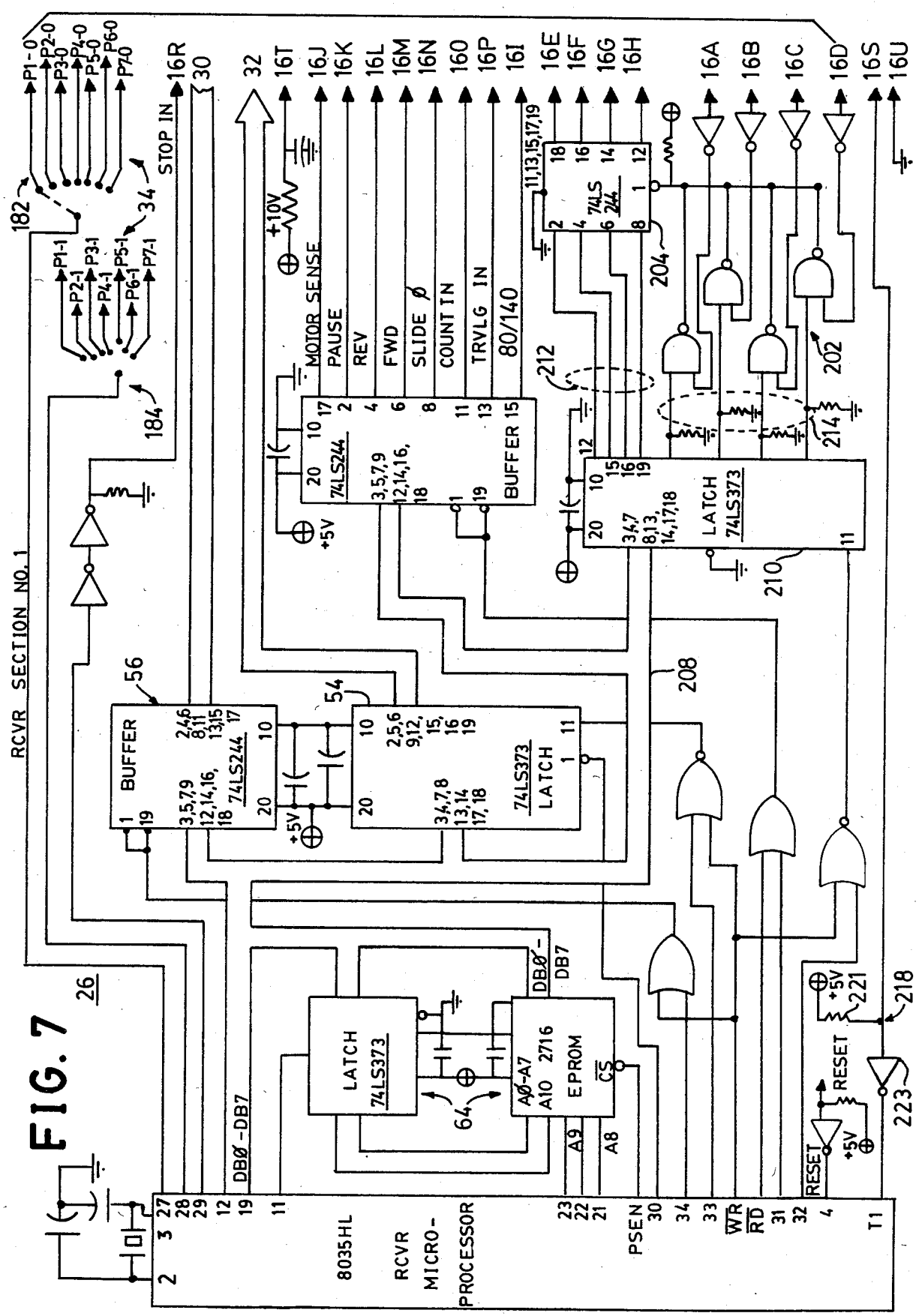
FIG. 7 is a detailed block and logic schematic diagram of a preferred embodiment of the receiver section of the interface arrangement of FIG. 1.

Referring now to FIGS. 6 and 7, there is illustrated for a specific embodiment the detailed logic and integrated circuit connections for the communication section 24 and the receiver section 26 respectively. In FIGS. 6 and 7, the reference numerals for the blocks and stages in FIG. 1 are used for referring to the corresponding circuitry and logic elements of FIGS. 6 and 7.

The communication microprocessor 44 of FIG. 6 includes an ALE output on pin 11 that is connected to the memory 52 and functions as an address latch enable. Three output signals of the microprocessor 44 on pins 21, 22 and 23 are utilized as base address control lines to the memory 52. The remainder of the address bits are provided from the databus 180. Four of the outputs of the microprocessor 44 on pins 35–38 are decoded by the decoder interface 51 to provide the communication controlled handshake control lines P1-1, P2-1, P3-1, P4-1, P5-1, P6-1, and P7-1 to each of the respective receivers or the number of receivers that are utilized. The decoder interface 51 along with the $\overline{RD}$ and $\overline{WR}$ outputs of microprocessor 44 also provides various read enable and write enable lines for control of data operation of the latch 46, the buffer 48, and the interface 40 to control data buses 30 and 32. The outputs P1-0, P2-0, P3-0, P4-0, P5-0, P6-0 and P7-0 provide the sensed input connections to the communication microprocessor 44 from the respective receiver sections #'s 1-7.

Referring now to FIG. 7, four of the outputs of the microprocessor 58 on pins 31, 32, 33 and 34 are used along with the $\overline{RD}$ and $\overline{WR}$ signals to control data bus control signals for the buffer 56 and the latch 54.

A first selection arrangement 182 represented by the jumper connection $J_1$ to one of the signals P1-0 to P7-0 of control bus 34 is utilized to identify the number of a particular receiver board and associated projector. For example, if $J_1$ is connected to P1-0, then the receiver is identified as receiver #1. Further, a second selection arrangement 184 represented by the jumper connection $J_2$ to one of the signals P1-1 to P7-1 of the control bus 34 is utilized to identify the number of the receiver. The $J_2$ connection is correlated to the $J_1$ connection such that $J_2$ is connected to P1-1 to identify receiver #1. The arrangement 182 and 184 in other specific embodiments are switches which are controlled or ganged to each other.

The control connections 16 in FIG. 7 are identified by function description and 16-alpha reference. The control connections 16A–16U are connected to the projector at connector 17D.

Figure 8:
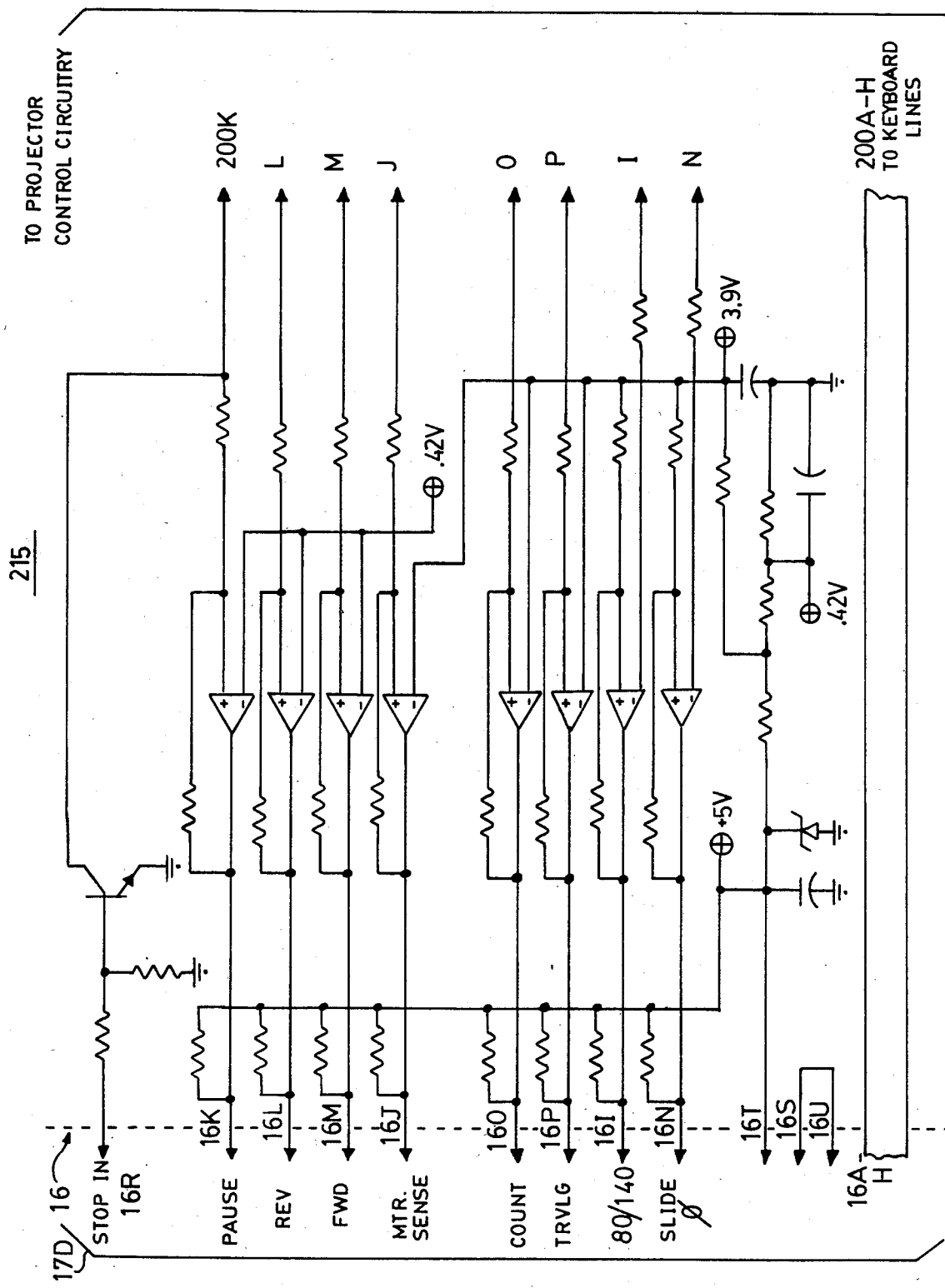
FIG. 8 is a logic and schematic diagram of a buffer and level control circuit for the slide projector controlled via the interface arrangement of FIG. 1.

Referring now to FIG. 8, a buffer and level control circuit 215 is shown for appropriately interfacing the projector of the aforementioned U.S. Pat. No. 4,452,518 as projector 12 or 14 in FIG. 1 to the receiver board of FIG. 7 via the control connection 16. The control connection 16 is provided as a multiconductor cable. For example, the control connections 16A–16U are shown at the left of the buffer and level control circuit and the control connections to the projector are shown as 200A-P at the right side of FIG. 8. Referring to FIGS. 1 and 4 of U.S. Pat. No. 4,452,518, the following table corresponds the control connections 200A-P to the connection points and signals in the slide projector control apparatus.

| FUNCTIONS | NUMBER | CONNECTION IN U.S. Pat. No. 4,452,518 |
|---|---|---|
| KEYBOARD | 200A–H | FIG. 1-Keyboard 28, CPU 24 and FIG. 14 (lines 512) |
| MOTOR SENSE | 200J | FIG. 1-Casette tape control 42 and FIG. 14–557 |
| PAUSE | 200K | FIG. 1-Casette Tape control 42 and FIG. 14–552 |
| REVERSE | 200L | FIGS. 2 and 4 at 52b |
| FORWARD | 200M | FIGS. 2 and 4 at 52a |
| SLIDE 0 | 200N | Home Switch input - at 560 (FIG. 14) |
| COUNT | 200O | FIGS. 1, 2 and 4 - at 100 Slide count |
| TRAVELING | 200P | FIGS. 1, 2 and 4- at 98, FIG. 14 - at 564 |
| 80/140 | 200I | FIG. 6 (460), FIG. 14 - at 558 |

Referring again now to FIG. 7, the interface stage 66 includes a keyboard control arrangement 202. An array of logic gates of the arrangement 202 is connected to the control lines 16A, 16B, 16C and 16D to synchronize the timing of keyboard control signals to the microprocessor of the controlled projector (e.g. lines 512 of the CPU24 in FIG. 14 of U.S. Pat. No. 4,452,518). When the projector CPU performs a keyboard decode for sensing keyboard inputs, the keyboard array lines connected to 16A, 16B, 16C and 16D are sequentially enabled. When each of the lines 16A–D is enabled, the projector CPU senses the keyboard array lines connected to lines 16E, 16F, 16G, and 16H to detect keyboard actuation and the particular digit that has been actuated for input. The enabled lines 16A, 16B, 16C and 16D through the logic gate array of the keyboard control arrangement 202 enable a buffer 204 at an enable input 206 at the appropriate time for synchronization with the projector CPU.

When the receiver microprocessor 58 is directed to output a slide number or mode command to the controlled projector, the appropriate data is placed on the data bus 208 which corresponds to the data bus included in bus 68 of FIG. 1. The data through latch 210 when enabled for output provides the data at 212 to the buffer 204. The data on data bus 208 includes the appropriate row and column data for the keyboard array corresponding to each numerical digit or function key representation to be input to the projector. The data at 212 corresponds to appropriate keyboard array column information, for example, and the row information on data bus 208 is presented to the logic data array of the keyboard control arrangement 202 on the lines 214 from the latch 210.

Accordingly, if a "1" is to be input to the projector, the data on lines 214 of bus 208 enables the buffer 204 at the enable time of the keyboard row for numeral "1" and the data on bus 208 at 212 provides the enablement of the line for the column of numeral "1". In response, the projector CPU interprets the signal as a keyboard input of numeral "1". For example, the data on bus 208 so as to place a "1" data bit on line 16E corresponds in one arrangement to column 1 of the projector keyboard. Further, the data on bus 208 also includes a "1" bit in the data to enable the gates connected to line 16A to provide a row 1 synchronization signal to the buffer 204. The resulting data on bus 208 in one arrangement is 11100001 for a numeral 1 keyboard simulation to the projector CPU. Thus, when the projector CPU enables the output line for row 1, line 16A provides an enable signal to the buffer 204 to provide an indication at line 16E to the projector CPU representing column 1 actuation during the enablement of row 1. This emulates the actuation of the key "1" on the projector keyboard.

Considering the input of a mode command to the projector, the successive numerals 2, 0, 1 simulated by appropriate operation of the keyboard control arrangement 202 are interpreted by the projector CPU as the command 201 for auto advance at 5 second intervals. For a GO TO slide 53 command, the host 20 sends an "STX NG53 ETX" message to the communication section 24, the communication section sends "53" data to the receiver 26, and the receiver 26 at control connection 16 simulates the keyboard actuation of the "5" key, the "3" key, and the "GO TO" key in sequence. Reference may be made to the aforementioned U.S. Pat. No. 4,452,518 for further discussion of keyboard controls and the entry of data.

Of course, it should also be realized that other specific arrangements are possible to connect the receiver control connection 16 to the slide projector to practice the present invention.

The control connection 16S is connected to a ground sensing arrangement 218 to indicate a ground at 16S to the receiver microprocessor 58. The control connection 16U is connected to ground 219. As seen in FIG. 8, when the projector 12 is connected to the receiver section 26, the control connections 16S and 16U are interconnected so that ground 219 is returned to the sensing arrangement 218. The sensing arrangement 218 includes a pull-up resistor 221 connected between the control connection 16S and a +5 volt supply, and an inverter gate 223 having an input connected to the control connection 16S. The output of the inverter gate 223 is connected to an input of the receiver microprocessor 58 at pin 39. With the projector 12 connected to the receiver section 26, a high level signal is provided to the receiver microprocessor 58. The sensed high level is interpreted by the receiver microprocessor 58 as the projector being connected as illustrated by decision block 114 of FIG. 3.

Figure 9:
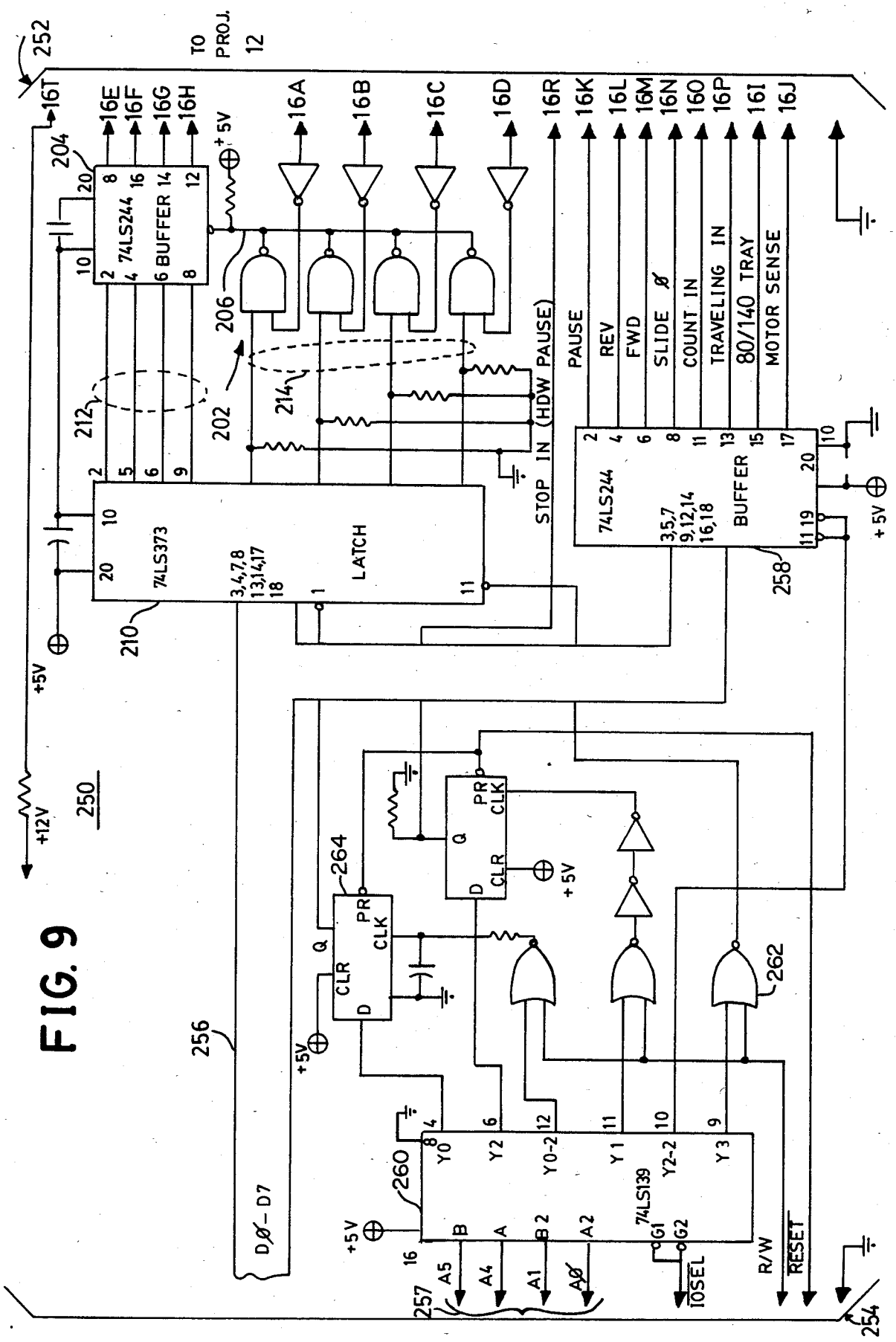
FIG. 9 is a detailed logic and block schematic diagram of an alternate embodiment of the present invention.

Referring now to FIG. 9 and considering an alternate embodiment of the present invention to control a slide projector from a computer, the interface arrangement 250 is utilized to control a projector such as the projector 12 or 14 via a control connection 252 in response to a computer connected via a control connection 254. The projector to be connected via the control connection 252 in a preferred embodiment is the projector of the aforementioned U.S. Pat. No. 4,452,518 provided with the buffer and level control circuit 215 of FIG. 8 and available as RINGMASTER® MODEL 860A from Bell & Howell Company, Chicago, Ill. The individual line connections of the control connection 252 are referred to in FIG. 9 using the same reference numerals for the identical connections in the receiver section of FIG. 7.

The interface stage 66 including the keyboard control arrangement 202 as described hereinbefore in connection with FIGS. 1 and 7 is also provided in the interface arrangement 250 with identical circuit components as referenced.

The control connection 254 to the computer is illustrated in FIG. 9 with appropriate interface connection to an Apple II Plus or Apple IIe available from Apple Computer Inc. or Bell & Howell Company or other compatible computer. The interface arrangement 250 is available from Bell & Howell Company, Visual Communications Group, Chicago, Ill. as the product "Interface Card/Cable for RINGMASTER® 860A". The interface arrangement 250 in the preferred embodiment is provided as a printed circuit board for insertion into an expansion slot of the computer.

The control connection 254 includes data bus connections D0–D7 connected to the data bus of the host 20 and referred to at 256, a +23 volt supply line, ground, a +5 volt supply line, the address bus lines A0, A1, A4 and A5 referred to at 257, the I/O select timing line, the R/W control line, and the reset line.

The interface stage 66 functions in response to data on the data bus 256 to simulate keyboard input to the projector 12. For example, if the digit "1" is to be sent to the projector 12, the data byte "E1" in Hexadecimal is placed on the data bus 256. For sensing the status of the projector 12 and maintaining the current slide tray position, the computer receives or reads data on the data bus 256 through the buffer 258 from the same lines 16I-P as discussed hereinbefore.

The following table is an example of the instruction sequence for sending a command from the host 20 to the projector 12 via the interface arrangement 250, where the host 20 is an Apple Computer as discussed hereinbefore:

| | | | |
|---|---|---|---|
| 1. | STA | $C710 | This instruction initializes the projector for keyboard input to simulate no key depression. The numeral "7" refers to the expansion slot # in the computer. |
| 2. | LDA | #$C8 | Instructions 2 and 3 form |
| 3. | JSR | $FCA8 | a time delay for keyboard debounce purposes |
| 4. | LDA | #$E1 | Loads computer accumulator with command code to be sent to projector |
| 5. | STA | $C733 | Transfer code to the interface 250 |
| 6. | STA | $C700 | Transfer code to the projector 12 (as simulated keyboard actuation) |
| 7. | LDA | #$C8 | Instructions 7. and 8. provide |
| 8. | JSR | $FCA8 | a time delay for keyboard debounce purposes |
| 9. | STA | $C710 | (See instruction 1) |
| 10. | LDA | #$C8 | Instructions 10 and 11 provide |
| 11. | JSR | $FCA8 | a time delay for keyboard debounce purposes |

The various command codes to be sent to the projector 12 by the computer on the data bus 256 are identical to the command codes as described hereinbefore that the receiver microprocessor 58 places on the data bus 208 in FIG. 7. This corresponds to the data bus portion of the bus 68 of FIG. 1.

The address lines 257 are connected to a dual, two to four decoder stage 260. The following is a truth table relating the inputs on the address lines 257 and the output states of the decoder 260:

| INPUTS | | | OUTPUTS | | | |
|---|---|---|---|---|---|---|
| G1 or G2 I/O SEL | B or B-2 A5 or A1 | A or A-2 A4 or A0 | Y0 or Y0-2 | Y1 | Y2 or Y2-2 | Y3 |
| H | X | X | H | H | H | H |
| L | L | L | L | H | H | H |
| L | L | H | H | L | H | H |
| L | H | L | H | H | L | H |
| L | H | H | H | H | H | L |

The I/O SELECT line goes low for a predetermined time duration whenever a "read" or "write" of a peripheral connector address is present on the address bus, for example, "C7" in the STA instruction discussed hereinbefore. When the I/O SELECT line goes low, the decoders 260 are enabled.

Considering first a "write" operation to simulate projector keyboard input, if a "33" in BCD (Binary Coded Decimal) is present on the address bus lines 257, according to the truth table for the decoders 260, the Y3 output of the decoders 260 will be at a low signal level and the remaining outputs that are utilized Y0, Y0-2, Y1, Y2, and Y2-2 will all be at high signal levels. The "33" corresponds to A4 and A5 both being high and A0 and A1 both being high. The state of the address bus for the computer to address "33" in BCD is as follows:

| MSD | | | | LSD | | | |
|---|---|---|---|---|---|---|---|
| A7 | A6 | A5 | A4 | A3 | A2 | A1 | A0 |
| 0 | 0 | 1 | 1 | 0 | 0 | 1 | 1 |

The low going output at the Y3 output of the decoder 260 through a NOR gate 262 causes pins 11 of the latch 210 to go from low to high to low.

Accordingly, the data on the data bus 256 will be latched by the latch 210 when the proper address is presented to the decoder 260 on the address bus 257. This is necessary since the data and address buses 256 and 257 are not latched by the computer at 254.

Subsequently a "∅∅" is presented on the address bus lines at 257. Accordingly, the Y0 and Y0-2 outputs of the decoders 260 will go to low signal levels and pin 1 of the latch 210 will go to a low signal level through the action of a flip-flop 264. The low level at pin 1 of the latch 210 causes the latched data to be output at lines 212 and 214 to simulate keyboard actuation of the projector 12. Pin 1 of the latch 210 will remain low until a "1∅" is "written" to the address bus 257. This causes the flip-flop 264 to toggle back to a high level output to pin 1 of the latch 210.

For the "reading" of sensed data by the computer from the lines 16I-P of the projector 12, a "12" is placed on the address line at 257 to enable the buffer 258. The buffer 258 at pins 1 and 19 is enabled by the Y2-2 output going low. The following instruction sequence provides for the monitoring of the sense inputs of the projector 12:

| 1. | LDA SC712 | Places projector sense inputs 16I-P on to data bus 256 and into computer accumulator |
| 2. | AND #S∅2 | SELECT BIT TO BE TESTED (corresponding to desired sense signal line) |
| 3. | CMP #S∅∅ | INSTRUCTIONS 3 and 4 check |

-continued

| 4. | BNE S∅E∅∅ | if selected bit is ∅. For example, check if PAUSE bit is at ∅ volts. If at ∅ volts, continue with program. If not, go back to location S∅E∅∅, which is step 1. |

While there has been illustrated and described several embodiments of the present invention, it will be apparent that various changes and modifications thereof will occur to those skilled in the art. It is intended in the appended claims to cover all such changes and modifications as fall within the true spirit and scope of the present invention.

What is claimed as new and desired to be secured by Letters Patent of the United States is:

1. A bidirectional communication control interface arrangement for controlling the operation of at least one random access slide projector in response to data message input signals from a host computer, each of the slide projectors including predetermined input control lines and control apparatus for performing predetermined functions responsive to predetermined control input signals and for providing control output sense signals representing the operating parameters of the slide projector, the bidirectional communication control interface arrangement comprising:

communication means for receiving said data message input signals and for sending data message output signals, said data message input signals having a first predetermined format and said data message output signals having a second predetermined format, receiver means responsive to said communication means for providing control input signals to a slide projector and for receiving the control output sense signals therefrom, one of said receiver means being provided for each projector to be controlled, said receiver means being interconnected to the projector over a predetermined multiconductor interconnection cable, said communication means comprising bus means for communicating with each of said receiver means and communication control means for controlling the sending of outgoing receiver data to said receiver means, said communication control means further comprising program control means responsive to said data message input signals for interpreting incoming data messages, said interpreting means comprising means responsive to predetermined command data messages for executing the corresponding command, said communication control means being responsive to said executing means to read command data to said receiver means, said receiver means being responsive to said command data.

2. The bidirectional communication control interface arrangement of claim 1 wherein said communication control means further comprises means for controlling the receiving of incoming data from said receiver, said receiver means comprises means responsive to the projector control output sense signals for sensing the operating condition of the connected slide projector, said receiver means further comprises means responsive to predetermined data codes on said bus means and said operating condition sensing means for controlling the sending of status response codes to said communication means.

3. The bidirectional communication control interface arrangement of claim 2 wherein said communication means comprises means for sending an error code data message in response to predetermined status response data received from said receiver means.

4. The bidirectional communication control interface of claim 1 including a plurality of said receiver means, said data messages including a command code and an identification code to select a particular one of said receiver means, said executing means further comprising means responsive to said identification codes for sending data representing said received command code to said receiver means corresponding to said identification code.

5. The bidirectional communication control interface arrangement of claim 4 wherein said command data messages include data format and rate representations to define data communication format and transmission rate changes, said communication means comprising means responsive to said data format and rate representations for conditioning said communication means to receive and send data messages in accordance with said defined communication format and data rates.

6. The bidirectional communication control interface arrangement of claim 1 wherein said bus means includes a data bus commonly connected to each of said receiver means and a control bus.

7. The bidirectional communication control interface arrangement of claim 6 wherein said control bus lines include an outgoing line to each of said receiver means and an incoming line from each of said receiver means.

8. The bidirectional communication control interface arrangement of claim 2 wherein the controlled projectors each include a manually actuable entry device for inputting data to the projector, said receiver means comprising entry control means operative over said multiconductor interconnection cable for controlling the entry of data to the projector in a format to emulate inputs of the manually actuable entry device.

9. A control arrangement for controlling a random access slide projector, the projector including status signals at an output connector representing operating parameters of the projector, the projector also including input control lines arranged to input signals and representing inputs from a keyboard array of predetermined numerical digits and mode keys to which the projector is responsive to control operation thereof, said control arrangement comprising:

bidirectional control means responsive to signals on a data bus and input/output control signals for inputting control information to and for reading data from the projector;

signal means responsive to said bidirectional control means and said data bus for outputting signals in a format to emulate inputs in the format of the projector; and means responsive to predetermined signals on an address bus for enabling said bidirectional control means in input and output formats, said bidirectional control means further comprising means responsive to said enabling means to selectively read data from said data bus and write data to said data bus.

* * * * *